US010761595B2

(12) United States Patent
Leppänen et al.

(10) Patent No.: US 10,761,595 B2
(45) Date of Patent: Sep. 1, 2020

(54) CONTENT BROWSING

(71) Applicant: Nokia Technologies Oy, Espoo (FI)

(72) Inventors: Jussi Leppänen, Tampere (FI); Antti Eronen, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/740,123

(22) PCT Filed: Jun. 22, 2016

(86) PCT No.: PCT/FI2016/050454
§ 371 (c)(1),
(2) Date: Dec. 27, 2017

(87) PCT Pub. No.: WO2017/005966
PCT Pub. Date: Jan. 12, 2017

(65) Prior Publication Data
US 2018/0188801 A1 Jul. 5, 2018

(30) Foreign Application Priority Data

Jul. 3, 2015 (EP) ..................................... 15175340

(51) Int. Cl.
*G06F 3/01* (2006.01)
*G02B 27/01* (2006.01)
(Continued)

(52) U.S. Cl.
CPC ............ *G06F 3/011* (2013.01); *G02B 27/017* (2013.01); *G06F 3/012* (2013.01); *G06F 3/017* (2013.01);
(Continued)

(58) Field of Classification Search
CPC .............................. G06F 3/011; G02B 27/017
(Continued)

(56) References Cited

U.S. PATENT DOCUMENTS 8,307,273 B2    11/2012    Pea et al.
8,453,060 B2    5/2013     Ofek et al.
(Continued)

FOREIGN PATENT DOCUMENTS

CN    101673171 A    3/2010
CN    102375741 A    3/2012
(Continued)

OTHER PUBLICATIONS

International Search Report and Written Opinion received for corresponding Patent Cooperation Treaty Application No. PCT/FI2016/050454, dated Aug. 12, 2016, 14 pages.
(Continued)

*Primary Examiner* — Hai Tao Sun
(74) *Attorney, Agent, or Firm* — Alston & Bird LLP

(57) ABSTRACT

A method, apparatus and computer program is provided. The method comprises: causing display of a panoramic menu in which a first panoramic menu item and a second panoramic menu item are simultaneously displayed, wherein the first panoramic menu item extends beyond a user's field of view and is associated with first mediated reality content, and the second panoramic menu item extends beyond a user's field of view and is associated with second mediated reality content, different from the first mediated reality content.

15 Claims, 15 Drawing Sheets

(51) Int. Cl.
  *G06K 9/00* (2006.01)
  *G06F 3/0482* (2013.01)
  *H04N 1/00* (2006.01)
  *G06T 19/00* (2011.01)
(52) U.S. Cl.
  CPC ....... *G06F 3/0482* (2013.01); *G06K 9/00671* (2013.01); *G06T 19/006* (2013.01); *H04N 1/00453* (2013.01); *G02B 2027/014* (2013.01); *G02B 2027/0123* (2013.01); *G02B 2027/0138* (2013.01)
(58) Field of Classification Search
  USPC ......................................................... 345/633
  See application file for complete search history.

(56) References Cited

U.S. PATENT DOCUMENTS

| | | | |
|---|---|---|---|
| 9,152,695 | B2 | 10/2015 | Tibrewal et al. |
| 9,667,864 | B2 | 5/2017 | Morimura et al. |
| 2004/0125133 | A1 | 7/2004 | Pea et al. |
| 2010/0157018 | A1* | 6/2010 | Lampotang ............. G06F 3/011 348/36 |
| 2011/0292076 | A1 | 12/2011 | Wither et al. |
| 2012/0038671 | A1 | 2/2012 | Min et al. |
| 2012/0188148 | A1* | 7/2012 | DeJong ............. G02B 27/0093 345/8 |
| 2012/0271830 | A1 | 10/2012 | Shiino et al. |
| 2013/0117707 | A1 | 5/2013 | Wheeler |
| 2013/0246967 | A1* | 9/2013 | Wheeler ................. G06F 3/012 715/784 |
| 2013/0326419 | A1 | 12/2013 | Harada et al. |
| 2014/0098102 | A1 | 4/2014 | Raffle et al. |
| 2014/0098186 | A1* | 4/2014 | Seidl ........................ G06T 15/10 348/36 |
| 2014/0111427 | A1* | 4/2014 | Lindley ............. G02B 27/0093 345/156 |
| 2014/0125761 | A1 | 5/2014 | Morimura et al. |
| 2014/0172831 | A1 | 6/2014 | Jin et al. |
| 2014/0320532 | A1 | 10/2014 | Kim et al. |
| 2014/0337321 | A1 | 11/2014 | Coyote et al. |
| 2015/0016777 | A1 | 1/2015 | Abovitz et al. |
| 2015/0036931 | A1 | 2/2015 | Loui et al. |

FOREIGN PATENT DOCUMENTS

| | | |
|---|---|---|
| CN | 102546921 A | 7/2012 |
| CN | 103458180 A | 12/2013 |
| CN | 103870535 A | 6/2014 |
| EP | 2743846 | 6/2014 |
| JP | H07-073338 A | 3/1995 |
| JP | 2001-506389 A | 5/2001 |
| JP | 2010-501931 A | 1/2010 |
| JP | 2012-242854 A | 12/2012 |
| JP | 2014-006880 A | 1/2014 |
| WO | 99/01838 A2 | 1/1999 |
| WO | 2008/027154 A1 | 3/2008 |

OTHER PUBLICATIONS

European Search Report received for corresponding European Patent Application No. 15175340.7, dated Nov. 9 2015, 8 pages.
Bimbo et al., "A Three-Dimenstional Iconic Environment for Image Database Querying," IEEE Transactions on Software Engineering, IEEE Service Center, Oct. 1, 1993, vol. 19, No. 10, 16 pages.
"Testing the Samsung Gear VR: Game Demos", YouTube, Retrieved on Dec. 10, 2018, Webpage available at https://www.youtube.com/watch?v=huyd7FqQGFY.
Samal et al., "Automatic Recognition and Analysis of Human Faces and Facial Expressions: A Survey", Pattern Recognition, vol. 25, No. 1, Jan. 1992, pp. 65-77.
Office action received for corresponding European Patent Application No. 15175340.7, dated Oct. 23, 2018, 9 pages.
Office action received for corresponding Japanese Patent Application No. 2017-568126, dated Nov. 26, 2018, 4 pages of office action and 3 pages of translation available.
Ishiguro et al., "Watch the Birdie! : A Mixed-Reality Attraction Using Tri-sensory Augmentation", Journal of the Virtual Reality Society of Japan, vol. 12, No. 3, 2007, 12 pages.
Extended European Search Report for European Application No. 16174826.4 dated Nov. 3, 2016.
Office Action for Mexican Application No. MX/a/2017/017089 dated Jul. 11, 2019.
Office Action for Chinese Application No. 201680039383.0 dated Dec. 30, 2019, 17 pages.

* cited by examiner

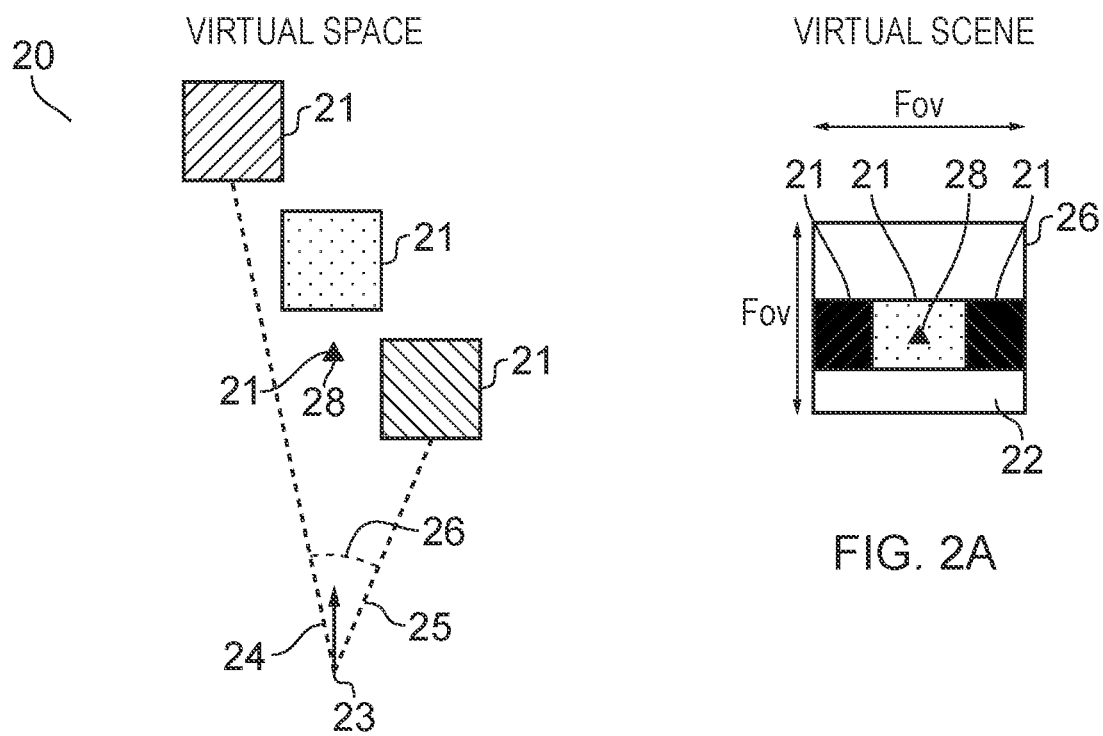
FIG. 1A
FIG. 2A
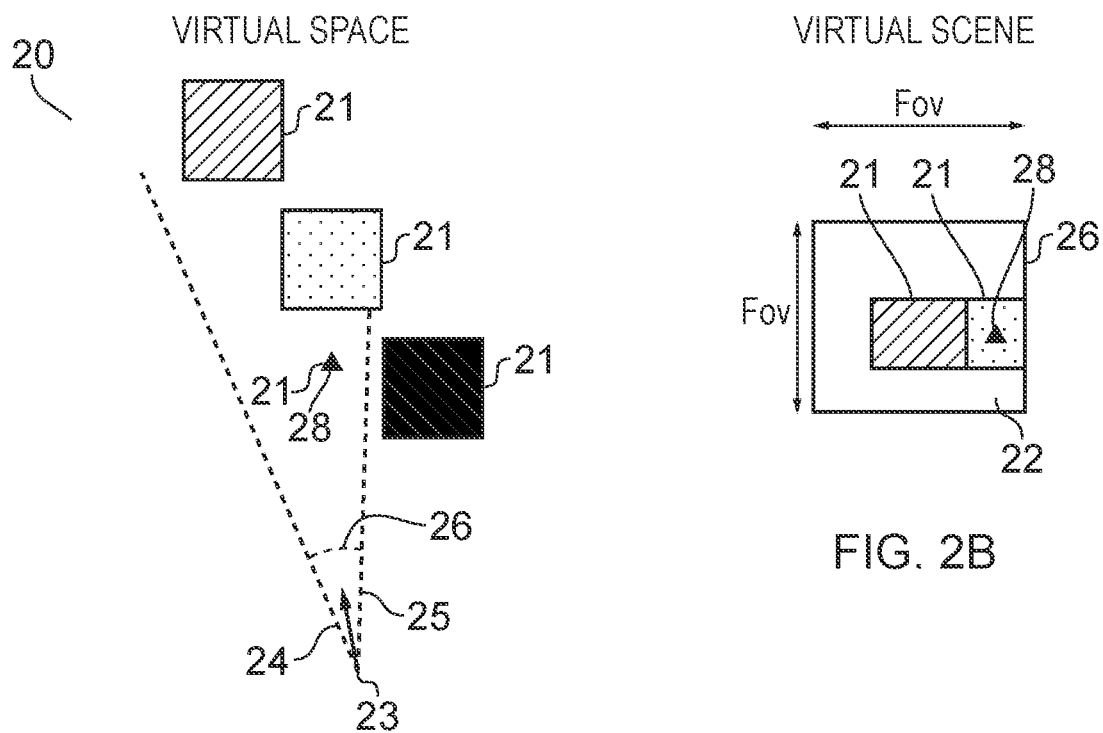
FIG. 1B
FIG. 2B

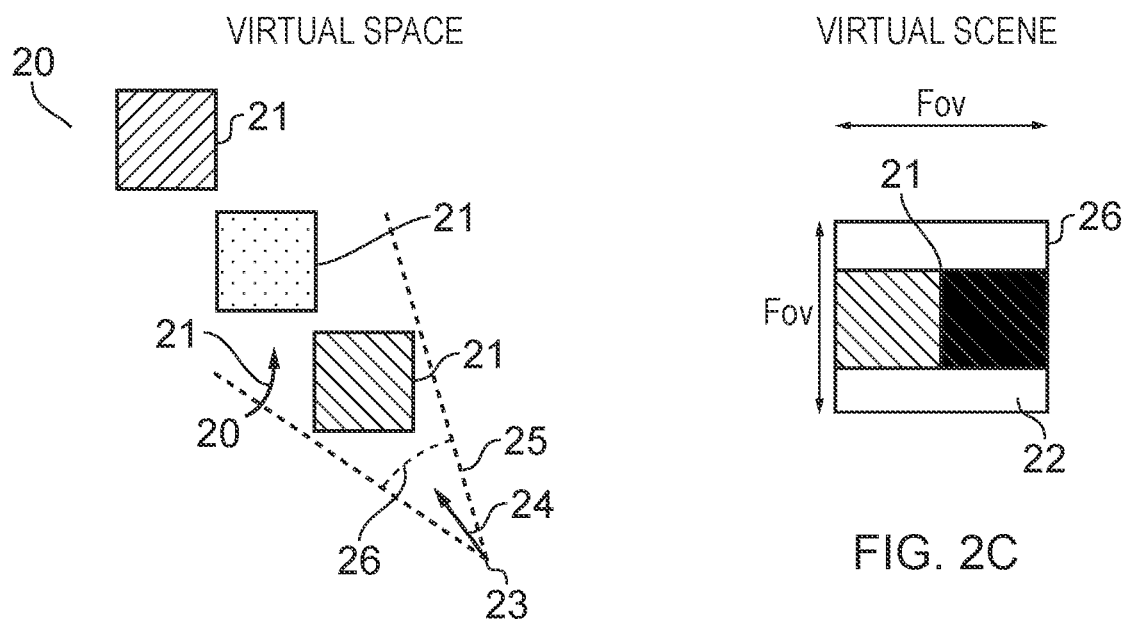
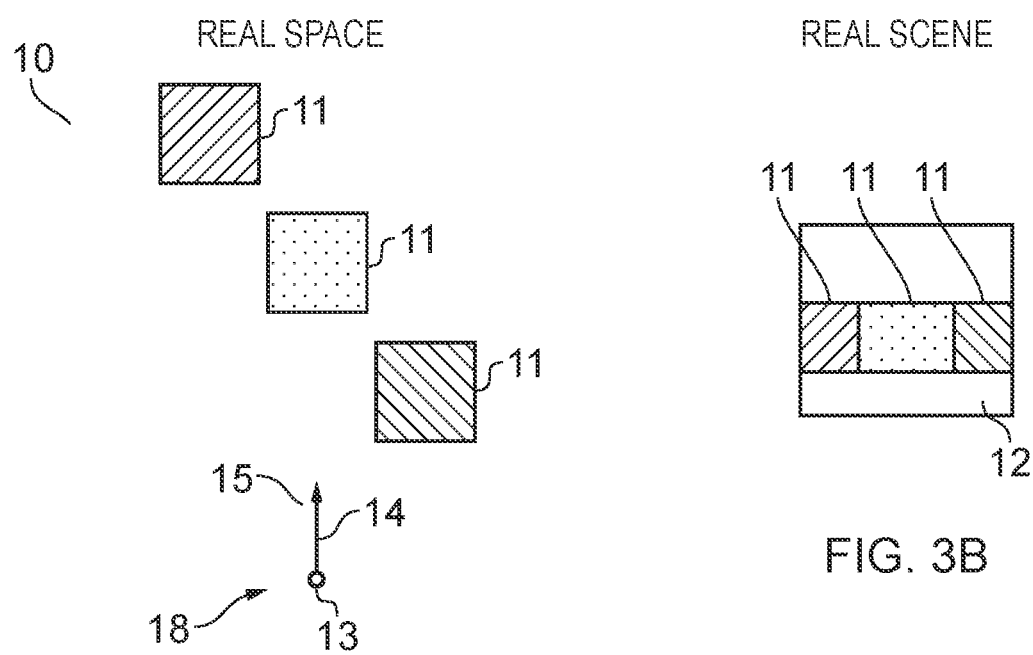

CONTENT BROWSING

RELATED APPLICATION

This application was originally filed as Patent Cooperation Treaty Application No. PCT/FI2016/050454 filed Jun. 22, 2016 which claims priority benefit to European Patent Application No. 15175340.7, filed Jul. 3, 2015.

TECHNOLOGICAL FIELD

Embodiments of the present invention relate to content browsing. In particular, they relate to browsing mediated reality content.

BACKGROUND

Mediated reality refers to a user experiencing an environment that is fully or partially artificial/virtual.

Augmented reality is a form of mediated reality in which a user experiences a partially artificial/virtual, partially real environment. Virtual reality is a form of mediated reality in which a user experiences a fully artificial/virtual environment.

BRIEF SUMMARY

According to various, but not necessarily all, embodiments of the invention there is provided a method, comprising: causing display of a panoramic menu in which a first panoramic menu item and a second panoramic menu item are simultaneously displayed, wherein the first panoramic menu item extends beyond a user's field of view and is associated with first mediated reality content, and the second panoramic menu item extends beyond a user's field of view and is associated with second mediated reality content, different from the first mediated reality content.

According to various, but not necessarily all, embodiments of the invention there is provided computer program code that, when performed by at least one processor, causes at least the following to be performed: causing display of a panoramic menu in which a first panoramic menu item and a second panoramic menu item are simultaneously displayed, wherein the first panoramic menu item extends beyond a user's field of view and is associated with first mediated reality content, and the second panoramic menu item extends beyond a user's field of view and is associated with second mediated reality content, different from the first mediated reality content.

According to various, but not necessarily all, embodiments of the invention there is provided an apparatus, comprising: means for causing display of a panoramic menu in which a first panoramic menu item and a second panoramic menu item are simultaneously displayed, wherein the first panoramic menu item extends beyond a user's field of view and is associated with first mediated reality content, and the second panoramic menu item extends beyond a user's field of view and is associated with second mediated reality content, different from the first mediated reality content.

According to various, but not necessarily all, embodiments of the invention there is provided an apparatus, comprising: at least one processor; and at least one memory storing computer program code that is configured, working with the at least one processor, to cause the apparatus to perform at least: causing display of a panoramic menu in which a first panoramic menu item and a second panoramic menu item are simultaneously displayed, wherein the first panoramic menu item extends beyond a user's field of view and is associated with first mediated reality content, and the second panoramic menu item extends beyond a user's field of view and is associated with second mediated reality content, different from the first mediated reality content.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIGS. 1A-1C and 2A-2C illustrate examples of mediated reality in which FIGS. 1A, 1B, 1C illustrate the same virtual space and different points of view and FIGS. 2A, 2B, 2C illustrate a virtual scene from the perspective of the respective points of view;

FIG. 3A illustrates an example of a real space and FIG. 3B illustrates an example of a real scene that partially corresponds with the virtual scene of FIG. 1B;

DESCRIPTION

Figure 4:
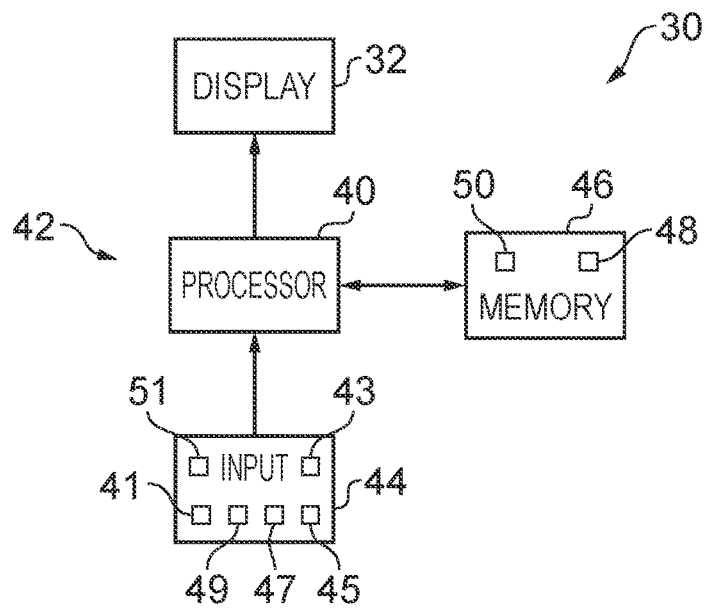
FIG. 4 illustrates an example of an apparatus that is operable to enable mediated reality and/or augmented reality and/or virtual reality.

Embodiments of the invention relate to content browsing. In particular, they relate to providing a panoramic menu in a mediated reality environment.

In embodiments of the invention, a panoramic menu is displayed which comprises at least first and second panoramic menu items that extend beyond a user's field of view. The first panoramic menu item is associated with first mediated reality content and the second menu item is associated with second mediated reality content.

The panoramic menu may be re-arranged based on an identified object of interest.

The panoramic menu provides a particularly efficient, intuitive way of browsing through and selecting mediated reality content and is described in further detail below.

Definitions

In this document, the following definitions apply:

"field of view" refers to extent of the observable world that is visible to a user at a particular instance in time;

"virtual space" refers to fully or partially artificial environment, which may be three dimensional;

"virtual scene" refers to a representation of the virtual space viewed from a particular point of view within the virtual space;

"real space" refers to a real environment, which may be three dimensional;

"real scene" refers to a representation of the real space viewed from a particular point of view within the real space;

"mediated reality" in this document refers to a user visually experiencing a fully or partially artificial environment (a virtual space) as a virtual scene at least partially displayed by a computer to a user. The virtual scene is determined by a point of view within the virtual space and a field of view. Displaying the virtual scene means providing it in a form that can be seen by the user;

"mediated reality content" is content which enables a user to visually experience a fully or partially artificial environment (a virtual space) as a virtual scene. Mediated reality content could include interactive content such as a video game or non-interactive content such as motion video;

"augmented reality" in this document refers to a form of mediated reality in which a user visually experiences a partially artificial environment (a virtual space) as a virtual scene comprising a real scene of a physical real world environment (real space) supplemented by one or more visual elements displayed by an apparatus to a user;

"augmented reality content" is a form of mediated reality content which enables a user to visually experience a partially artificial environment (a virtual space) as a virtual scene. Augmented reality content could include interactive content such as a video game or non-interactive content such as motion video;

"virtual reality" in this document refers to a form of mediated reality in which a user visually experiences a fully artificial environment (a virtual space) as a virtual scene displayed by an apparatus to a user;

"virtual reality content" is a form of mediated reality content which enables a user to visually experience a fully artificial environment (a virtual space) as a virtual scene. Virtual reality content could include interactive content such as a video game or non-interactive content such as motion video;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view determines the point of view within the virtual space;

"user interactive-mediated" as applied to mediated reality, augmented reality or virtual reality means that user actions at least partially determine what happens within the virtual space; and "displaying" means providing in a form that is perceived visually by the user.

DETAILED DESCRIPTION

FIGS. 1A-1C and 2A-2C illustrate examples of mediated reality. The mediated reality may be augmented reality or virtual reality.

FIGS. 1A, 1B, 1C illustrate the same virtual space 20 comprising the same virtual objects 21, however, each Fig illustrates a different point of view 24. The position and direction of a point of view 24 can change independently. The direction (but not the position) of the point of view 24 changes from FIG. 1A to FIG. 1B. The direction and the position of the point of view 24 changes from FIG. 1B to FIG. 1C.

FIGS. 2A, 2B, 2C illustrate a virtual scene 22 from the perspective of the different points of view 24 of respective FIGS. 1A, 1B, 1C. The virtual scene 22 is determined by the point of view 24 within the virtual space 20 and a field of view 26. The virtual scene 22 is at least partially displayed to a user.

The virtual scenes 22 illustrated may be mediated reality scenes, virtual reality scenes or augmented reality scenes. A virtual reality scene displays a fully artificial virtual space 20. An augmented reality scene displays a partially artificial, partially real virtual space 20.

The mediated reality, augmented reality or virtual reality may be user interactive-mediated. In this case, user actions at least partially determine what happens within the virtual space 20. This may enable interaction with a virtual object 21 such as a visual element 28 within the virtual space 20.

The mediated reality, augmented reality or virtual reality may be perspective-mediated. In this case, user actions determine the point of view 24 within the virtual space 20, changing the virtual scene 22. For example, as illustrated in FIGS. 1A, 1B, 1C a position 23 of the point of view 24 within the virtual space 20 may be changed and/or a direction or orientation 25 of the point of view 24 within the virtual space 20 may be changed. If the virtual space 20 is three-dimensional, the position 23 of the point of view 24 has three degrees of freedom e.g. up/down, forward/back, left/right and the direction 25 of the point of view 24 within the virtual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates a real space 10 comprising real objects 11 that partially corresponds with the virtual space 20 of FIG. 1A. In this example, each real object 11 in the real space 10 has a corresponding virtual object 21 in the virtual space 20, however, each virtual object 21 in the virtual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual space 20.

FIG. 3B illustrates a real scene 12 that partially corresponds with the virtual scene 22 of FIG. 1B, it includes real objects 11 but not artificial virtual objects. The real scene is from a perspective corresponding to the point of view 24 in the virtual space 20 of FIG. 1A. The real scene 12 content is determined by that corresponding point of view 24 and the field of view 26.

FIG. 2A may be an illustration of an augmented reality version of the real scene 12 illustrated in FIG. 3B. The virtual scene 22 comprises the real scene 12 of the real space 10 supplemented by one or more visual elements 28 displayed by an apparatus to a user. The visual elements 28 may be a computer-generated visual element. In a see-through arrangement, the virtual scene 22 comprises the actual real scene 12 which is seen through a display of the supplemental visual element(s) 28. In a see-video arrangement, the virtual scene 22 comprises a displayed real scene 12 and displayed supplemental visual element(s) 28. The displayed real scene 12 may be based on an image from a single point of view 24 or on multiple images from different points of view 24 at the same time, processed to generate an image from a single point of view 24.

FIG. 4 illustrates an example of an apparatus 30 that is operable to enable mediated reality and/or augmented reality and/or virtual reality.

The apparatus 30 comprises a display 32 for providing at least parts of the virtual scene 22 to a user in a form that is perceived visually by the user. The display 32 may be a visual display that provides light that displays at least parts of the virtual scene 22 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may be implemented using instructions that enable hardware functionality, for example, by using executable computer program instructions 48 in a general-purpose or special-purpose processor 40 that may be stored on a computer readable storage medium (disk, memory, etc.) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods illustrated in FIGS. 5 & 6. The processor 40 by reading the memory 46 is able to load and execute the computer program 48.

The apparatus 30 therefore comprises: at least one processor 40; and at least one memory 46 including computer program code 48 the at least one memory 46 and the computer program code 48 configured to, with the at least one processor 40, cause the apparatus 30 at least to perform: causing display of a panoramic menu in which a first panoramic menu item and a second panoramic menu item are simultaneously displayed, wherein the first panoramic menu item extends beyond a user's field of view and is associated with first mediated reality content, and the second panoramic menu item extends beyond a user's field of view and is associated with second mediated reality content, different from the first mediated reality content.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The signal could, for example, be sent over a wireless connection (such as a radio frequency connection) or a wired connection in accordance with one or more protocols. The apparatus 30 may propagate or transmit the computer program 48 as a computer data signal.

Although the memory 46 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable):

(i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 5:
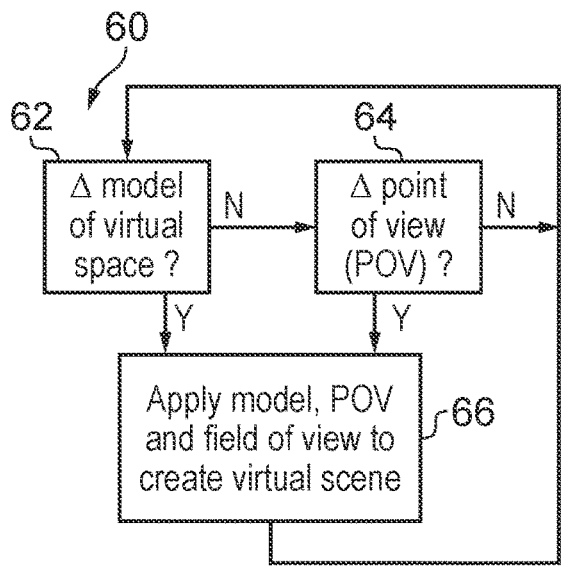
FIG. 5 illustrates an example of a method for enabling mediated reality and/or augmented reality and/or virtual reality.
Figure 6:
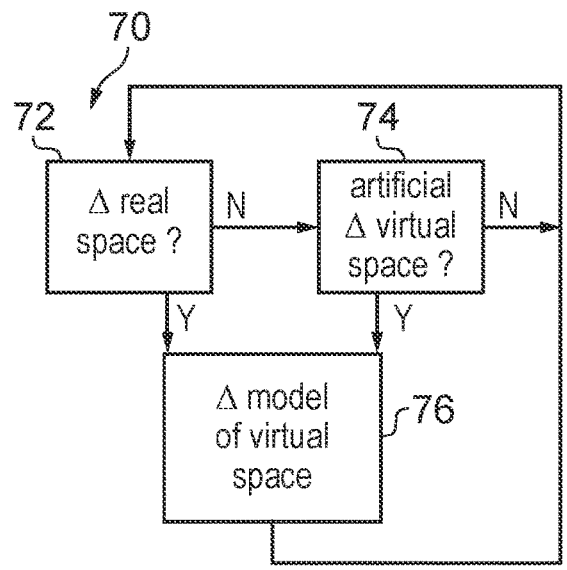
FIG. 6 illustrates an example of a method for updating a model of the virtual space for augmented reality.

The blocks illustrated in FIGS. 5 & 6 may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The apparatus 30 may enable mediated reality and/or augmented reality and/or virtual reality, for example using the method 60 illustrated in FIG. 5 or a similar method. The controller 42 stores and maintains a model 50 of the virtual space 20. The model may be provided to the controller 42 or determined by the controller 42. For example, sensors in input circuitry 44 may be used to create overlapping depth maps of the virtual space from different points of view and a three dimensional model may then be produced.

At block 62 it is determined whether or not the model of the virtual space 20 has changed. If the model of the virtual space 20 has changed the method moves to block 66. If the model of the virtual space 20 has not changed the method moves to block 64.

At block 64 it is determined whether or not the point of view 24 in the virtual space 20 has changed. If the point of view 24 has changed the method moves to block 66. If the point of view 24 has not changed the method returns to block 62.

At block 66, a two-dimensional projection of the three-dimensional virtual space 20 is taken from the location 23 and in the direction 25 defined by the current point of view 24. The projection is then limited by the field of view 26 to produce the virtual scene 22. The method then returns to block 62.

Where the apparatus 30 enables augmented reality, the virtual space 20 comprises objects 11 from the real space 10 and also visual elements 28 not present in the real space 10. The combination of such visual elements 28 may be referred to as the artificial virtual space. FIG. 6 illustrates a method 70 for updating a model of the virtual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differentiating and may be achieved at an object level using computer vision to track objects as they move.

At block 74 it is determined whether or not the artificial virtual space has changed. If the artificial virtual space has changed the method moves to block 76. If the artificial virtual space has not changed the method returns to block 72. As the artificial virtual space is generated by the controller 42 changes to the visual elements 28 are easily detected.

At block 76, the model of the virtual space 20 is updated.

The apparatus 30 may enable user-interactive mediation for mediated reality and/or augmented reality and/or virtual reality. The user input circuitry 44 detects user actions using user input 43. These user actions are used by the controller 42 to determine what happens within the virtual space 20. This may enable interaction with a visual element 28 within the virtual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual space 20, changing the virtual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the controller 42 to determine the point of view 24 within the virtual space 20, changing the virtual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation.

The apparatus 30 may comprise as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

In some but not necessarily all embodiments, the input circuitry 44 may comprise one or more keys/buttons. At least some of the keys/buttons may form part of a physical, hand held controller. Alternatively or additionally, if the apparatus 30 is head-mounted, at least some of the keys/buttons may be positioned on the head-mounted apparatus.

Figure 7:
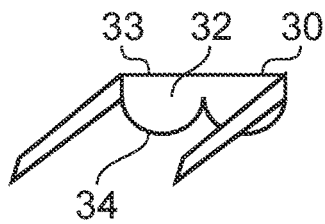
FIG. 7 illustrates an example of an apparatus that enables display of at least parts of the virtual scene to a user.

FIG. 7 illustrates an example of the apparatus 30 in the form of head-mounted apparatus 33 comprising a display 32 that displays images to a user. The head-mounted apparatus 33 is moved when the head of the user moves.

The head-mounted apparatus 33 may be a see-through arrangement for augmented reality that enables a live real scene 12 to be viewed while one or more visual elements 28 are displayed by the display 32 to the user to provide in combination the virtual scene 22. In this case a visor 34, if present, is transparent or semi-transparent so that the live real scene 12 can be viewed through the visor 34.

The head-mounted apparatus 33 may be operated as a see-video arrangement for augmented reality that enables a live or recorded video of a real scene 12 to be displayed by the display 32 for viewing by the user while one or more visual elements 28 are simultaneously displayed by the display 32 for viewing by the user. The combination of the displayed real scene 12 and displayed one or more visual elements 28 provides the virtual scene 22 to the user. In this case a visor 34 is opaque and may be used as display 32.

Referring back to FIG. 4, an apparatus 30 may enable user-interactive mediation for mediated reality and/or augmented reality and/or virtual reality. The user input circuitry 44 detects user actions using user input 43. These user actions are used by the controller 42 to determine what happens within the virtual space 20. This may enable interaction with a visual element 28 within the virtual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user moves. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body.

The tracking of one or more objects and/or points in relation to a user's body may be used by the apparatus 30 in gesture recognition and so on.

Figure 8A:
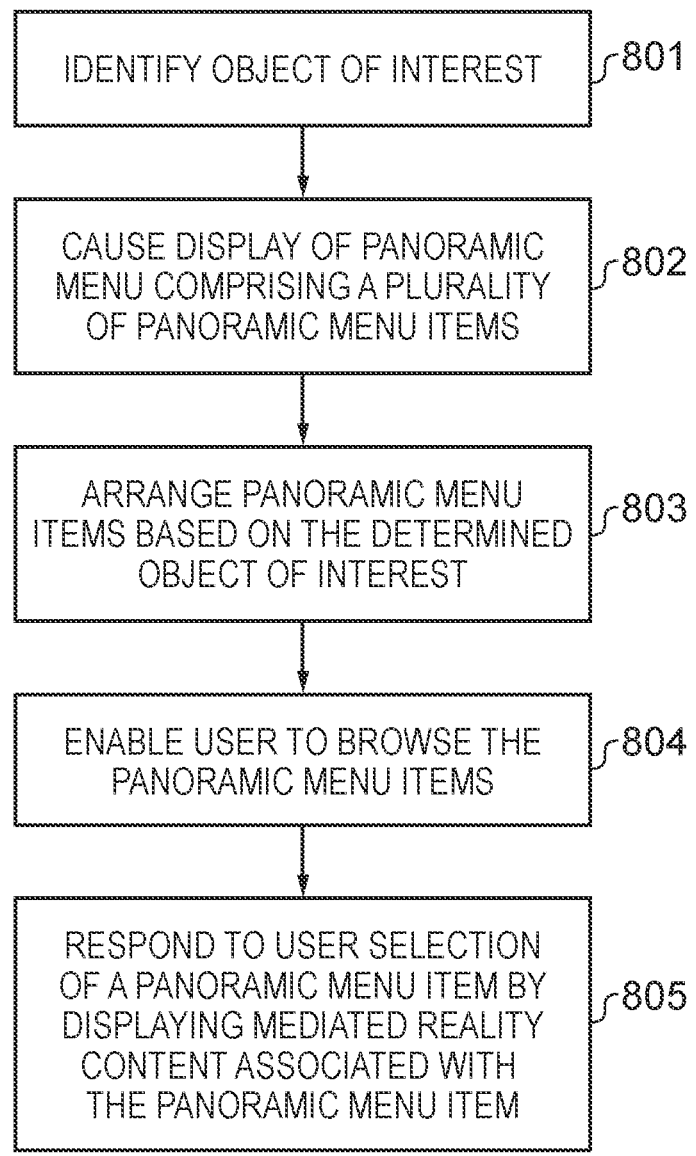
FIG. 8A illustrates a first method of providing and re-arranging a panoramic menu.

FIG. 8A illustrates a flow chart of a first method of displaying a panoramic menu, re-arranging menu items in the panoramic menu and enabling a user to select the menu items.

Figure 9:
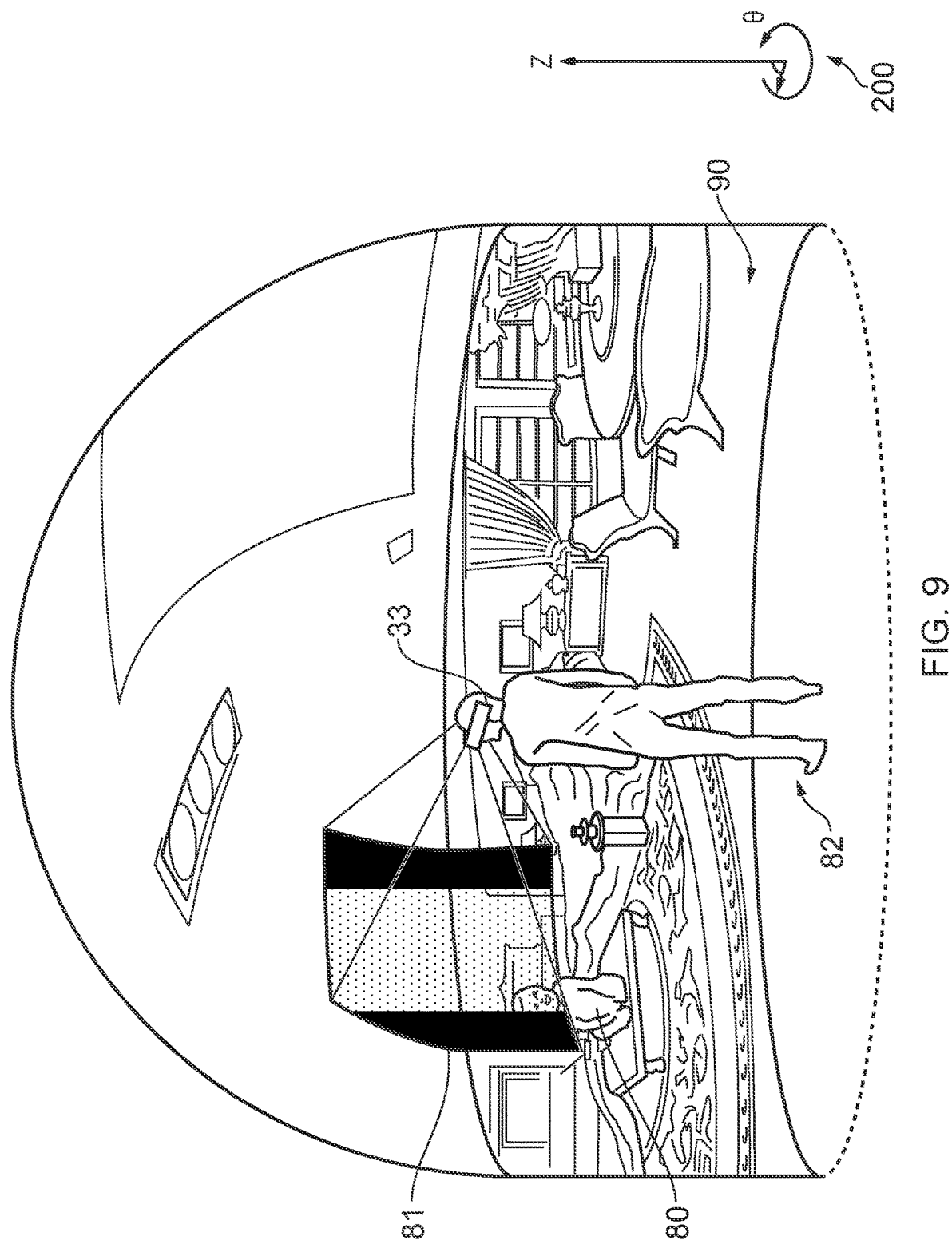
FIG. 9 illustrates a user viewing mediated reality content.

FIG. 9 illustrates a user 82 viewing (visual) mediated reality content 90 displayed by the display 32 of the apparatus 30. In the example described below and illustrated in the figures, the mediated reality content 90 is (visual) virtual reality content that enables the user to experience a fully artificial/virtual environment. In other examples, the mediated reality content 90 could be augmented reality content that enables the user to experience a partially artificial/virtual, partially real environment.

FIG. 9 also illustrates a cylindrical co-ordinate system 200. The cylindrical co-ordinate system is defined by a height dimension z, a radial dimension r and an azimuthal dimension ø. The user's field of view may be defined using the azimuthal and height dimensions ø, z.

The mediated reality content 90 extends around the body of the user 82 and beyond the field of view of the user 82, in the azimuthal dimension ø, when it is viewed. This means that it is not possible for the user 82 to see the whole of the displayed mediated reality content 90 at any one instance in time. The mediated reality content 90 may extend around 180 degrees or more in the azimuthal dimension ø. In some examples, the mediated reality content 90 may extend around 360 degrees in the azimuthal dimension ø.

In the example illustrated in FIG. 9, the user 82 is wearing a head-mounted apparatus 33 that enables him to view the mediated reality content 90 in a first person perspective-mediated manner. The mediated reality content 90 extends 360 degrees around the user 82 in the azimuthal dimension ø, but this is not shown in FIG. 9 for clarity purposes.

The whole of the mediated reality content 90 need not be displayed at the same time. That is, the angular range over which the mediated reality content 90 may be viewed by the user 82 by moving his head and/or eyes may be greater than the angular range over which the mediated reality content 90 is displayed by the display 32 at a particular instance in time.

As the user 82 experiences the mediated reality content 90, the processor 40 continually cycles through the method illustrated in FIG. 5 and, in the case of augmented reality content, FIG. 6.

The cross-hatched area in FIG. 9 labelled with the reference numeral 81 indicates a central portion of the user's field of view. The central portion 81 of the user's field of view indicates what the user 82 is (directly) looking at. When the user 82 changes his point of view, the central portion 81 of his field of view changes. It can be seen in FIG. 9 that the mediated reality content 90 includes a (virtual) object 80. In this example the (virtual) object 80 is a person, but it need not be in other examples.

Figure 10:
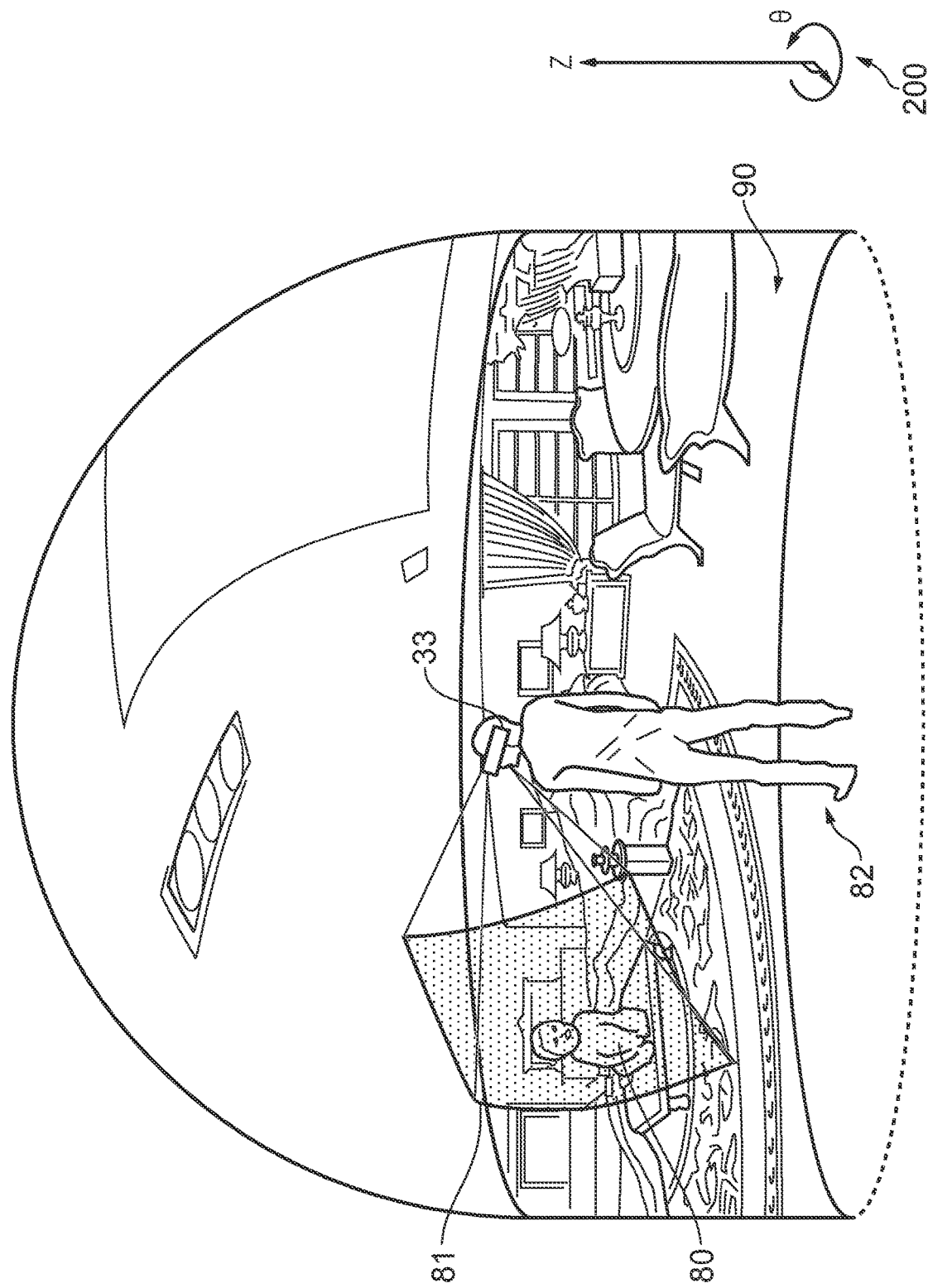
FIG. 10 illustrates an object of interest being determined in the mediated reality content.

At block 801 in FIG. 8A, the processor 40 of the apparatus 30 identifies that the object 80 is of interest to the user 82. This may be at least partly based on a determination that the user 82 has changed his point of view to look directly towards the object 80, as shown in FIG. 10, such that the central portion 81 of his field of view is aligned with the position of the object 80 in the mediated reality content 90. Alternatively or additionally, the processor 40 may, for example, determine that the user has changed his point of view to look directly towards the object 80 by tracking the user's gaze, for instance by using the pupil tracking technology described above.

Alternatively or additionally, the apparatus 30 may enable the user 82 may identify that an object is of interest by enabling the user 82 to select an object using an alternative method of user input. For example, the apparatus 30 may enable the user to select an object by actuating one or more joysticks/keys/buttons, or by making a gesture.

In some embodiments, the mediated reality content 90 has associated metadata which identifies the presence and location of one or more objects in the mediated reality content 90. That is, the metadata predefines the presence and location of one or more objects in the mediated reality content 90. The metadata may identify the presence and location of the object(s) over a time period, and indicate how the presence and location of that/those object(s) in the mediated reality content 90 changes over the time period.

In some alternative embodiments, instead of using metadata to identify objects in the mediated reality content 90 the processor 40 may, for example, perform image processing on the mediated reality content 90 in order to identify objects 80. The processor 40 of the apparatus 30 may continually perform image processing on the mediated reality content 90 such that objects, such as the object 80 illustrated in FIGS. 9 and 10, are automatically identified as the user 82 changes his point of view when viewing the mediated reality content 90. In other embodiments, the image processing may only be performed in response to an input from the user, which acts as a prompt to perform image processing on objects within the user's field of view or, alternatively, objects within (only) the central portion 81 of the user's field of view.

After the object 80 has been identified to be an object of interest to the user 82, the processor 40 determines whether the identified object of interest 80 is present in other mediated reality content which is different from that being viewed by the user 82 in FIGS. 8A and 9. The processing that is performed by the processor 40 in this respect may be done by analyzing metadata associated with the mediated reality content or performing image processing in the manner discussed above.

The processor 40 then causes a panoramic menu to be displayed by the display 32 in block 802 in FIG. 8A. The panoramic menu may be displayed after one or more inputs have been received from the user 82.

In this example, if the processor 40 determines that the identified object of interest 80 is present in a mediated reality content item, a panoramic menu item for that mediated reality content is included in the panoramic menu 100.

Figure 11:
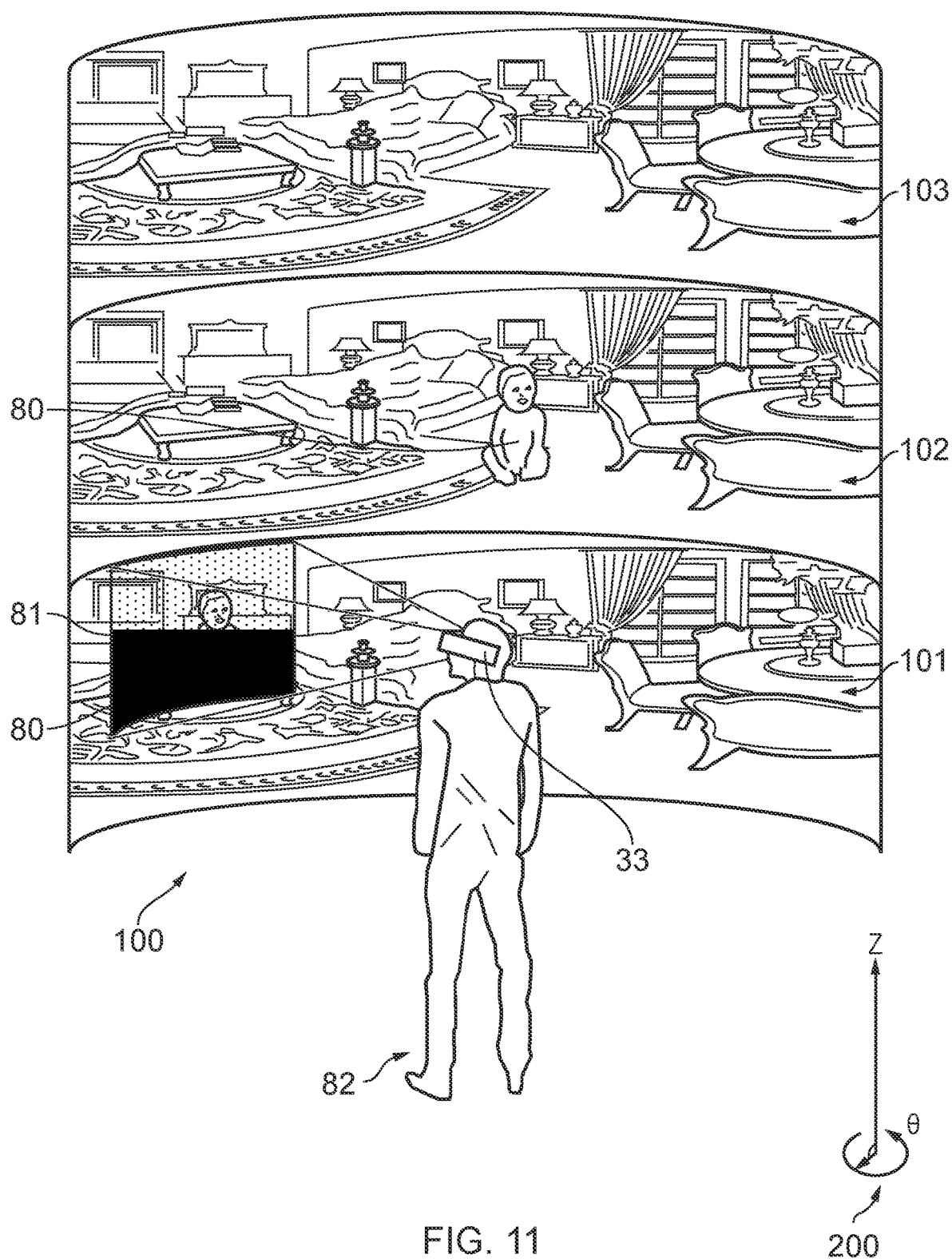
FIG. 11 illustrates a user viewing a panoramic menu comprising multiple panoramic menu items.

FIG. 11 illustrates the panoramic menu 100 being displayed by the display 32. In this example, the panoramic menu 100 comprises first, second and third panoramic menu items 101, 102 and 103, which are simultaneously displayed. Each of the panoramic menu items 101, 102, 103 is associated with (for example, represents) respective mediated reality content which includes the identified object of interest 80, and each menu item 101, 102, 103 extends beyond the user's field of view.

The panoramic menu 100 is itself displayed in mediated reality, such as virtual reality or augmented reality. In the latter case, the user 82 is able to see one or more real objects in addition to the panoramic menu 100 while the panoramic menu 100 is being displayed by the display 32. In the example illustrated in FIG. 11, the user 82 is able to view the panoramic menu 100 in a first person perspective-mediated manner via the head-mounted apparatus 33. As the user 82 views the panoramic menu 100, the processor 40 continually cycles through the method illustrated in FIG. 5 (in the case of the panoramic menu 100 being shown in virtual reality) or FIG. 6 (in the case of the panoramic menu being shown in augmented reality).

In the illustrated example, a panoramic menu item 101, 102, 103 for a particular mediated reality content item is a static image that is a spatial slice of that mediated reality content captured at an instance in time. Each panoramic menu item 101, 102, 103 has a reduced height in the height dimension z relative to the mediated reality content it represents.

For example, upper and lower portions of a static image derived from the mediated reality content item may be cut off to form the panoramic menu item for that mediated reality content item.

The panoramic menu items 101, 102, 103 are displayed vertically relative to one another and may form at least part of a virtual tube. The virtual tube could be a closed tube such that the panoramic menu items 101, 102, 103 extend around 360 degrees in the azimuthal dimension ø, or an open tube such that the panoramic menu items 101, 102, 103 extend around less than 360 degrees in the azimuthal dimension ø. The cross section of the virtual tube could, for example, be circular or elliptical. The length of the virtual tube is aligned with the height dimension z in the figures.

The second panoramic menu item 102 is positioned above the first panoramic menu item 101. The third panoramic menu item 103 is positioned above the second panoramic menu item 102.

In other examples, the panoramic menu items 101, 102, 103 may be displayed horizontally relative to one another and form at least part of a virtual tube that is orthogonal to that illustrated in the figures.

While three panoramic menu items 101, 102, 103 are illustrated in FIG. 11, more or fewer panoramic menu items 101, 102, 103 may be present in other examples.

The panoramic menu items 101-103 extend beyond the field of view of the user 82 in the azimuthal dimension ø when they are viewed by the user 82. This means that it is not possible for the user 82 to see the whole of any individual one of the panoramic menu items 101-103 at any one instance in time. Each of the panoramic menu items 101-103 may, for example, extend around 180 degrees or more in the azimuthal dimension ø. In some examples, each of the panoramic menu items 101-103 may extend around 360 degrees in the azimuthal dimension ø.

In FIG. 11, the identified object of interest 80 is included in the first and second panoramic menu items 101, 102 and is visible to the user 82. The identified object of interest 80 is not currently visible to the user 82 in the third panoramic menu item 103, but is present at a different location on the third panoramic menu item 103 which the user 82 cannot currently see.

Figure 12:
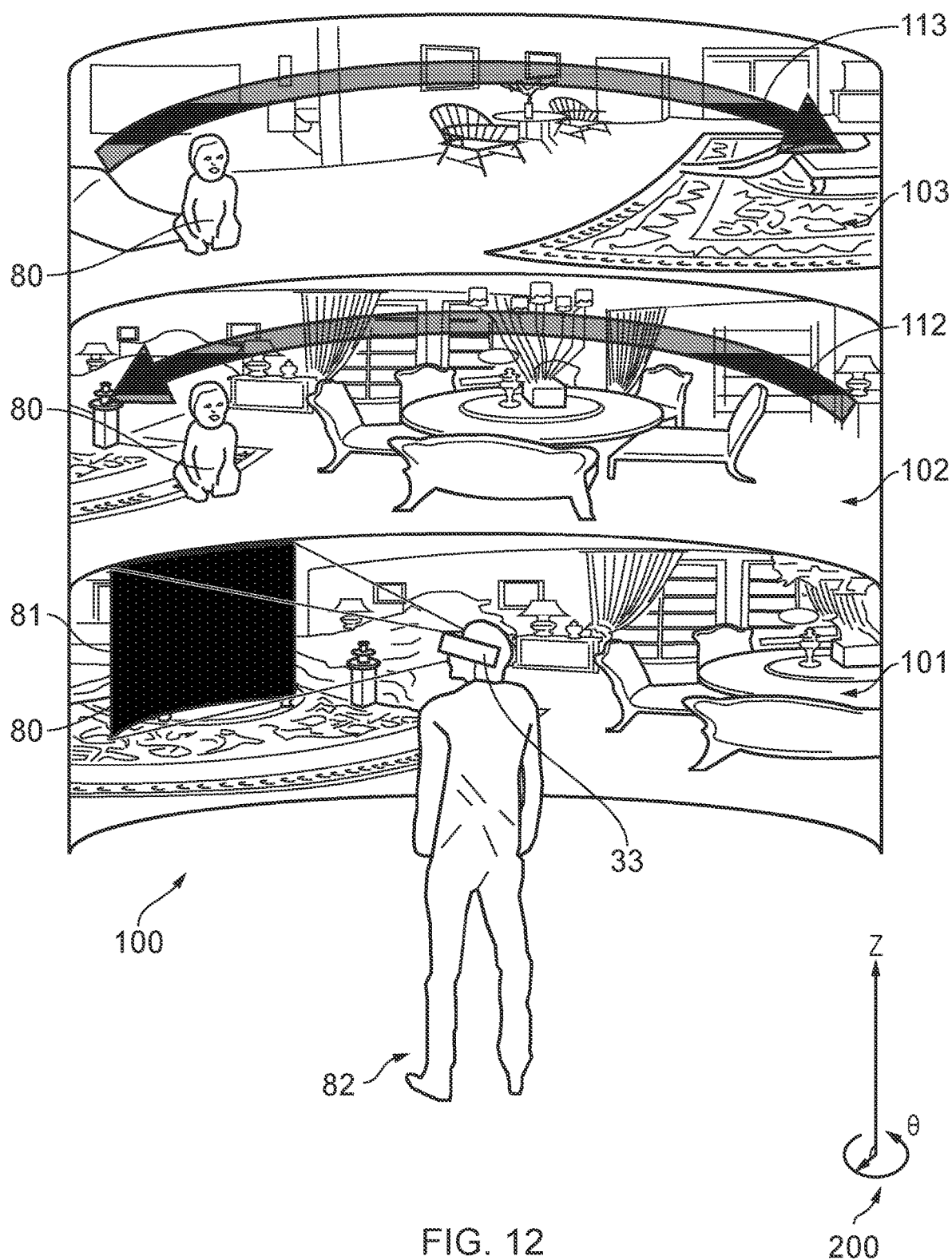
FIG. 12 illustrates the panoramic menu after panoramic menu items in the panoramic menu have been re-arranged based on the determined object of interest.

In block 803 in FIG. 8A, the panoramic menu items 101-103 are (re)arranged based on the identified object of interest 80. FIG. 12 illustrates first, second and third panoramic menu items 101, 102, 103 being re-arranged. In the illustrated example, the panoramic menu items 101-103 are re-arranged based on the location of the object of interest 80 in the menu items 101-103 relative to the user's point of view.

In FIG. 12, it can be seen that the central portion 81 of the user's field of view is aligned with the location of the object of interest 80 in the first panoramic menu item 101 in both the height dimension z and the azimuthal dimension ø. The processor 40 determines that the location of the object of interest 80 in the first panoramic menu item 101 is aligned with the central portion 81 of the user's field of view in the azimuthal dimension ø, so it refrains from moving the first panoramic menu item 101 when the re-arrangement takes place.

The processor 40 determines that the object of interest 80 in both the second panoramic menu item 102 and the third panoramic menu item 103 is not aligned with the central portion 81 of the user's field of view in the azimuthal dimension ø. In response, the processor 40 moves the second panoramic menu item 102 by causing it to rotate in the azimuthal dimension ø as indicated by the arrow labelled with the reference numeral 112 in FIG. 12. The processor 40 also moves the third panoramic menu item 103 by causing it to rotate in the azimuthal dimension ø in as indicated by the arrow labelled with the reference numeral 113 in FIG. 12. It can be seen in FIG. 12 that after the processor 40 has caused the second and third panoramic menu items 102, 103 to rotate, the object of interest 80 in each of the first, second and third panoramic menu items 101-103 is aligned in the azimuthal dimension ø (and stacked above one another in the height dimension z).

The processor 40 may also re-order the panoramic menu items 101-103 in the height dimension z depending upon whether the object of interest 80 is present in mediated reality content associated with each of the panoramic menu items 101-103. For example, panoramic menu items 101-103 that are associated with mediated reality content which includes the object of interest 80 may be positioned closer to the user 82 than panoramic menu items 101-103 which are associated with mediated reality content that does not include the object of interest 80. In some embodiments, panoramic menu items 101-103 that are associated with mediated reality content that does not include the object of interest 80 may be removed from the panoramic menu 100.

While the panoramic menu items 101-103 are re-ordered in the height dimension z in this illustrated example, in other examples the panoramic menu items 101-103 may be re-ordered in a different manner.

Figure 13:
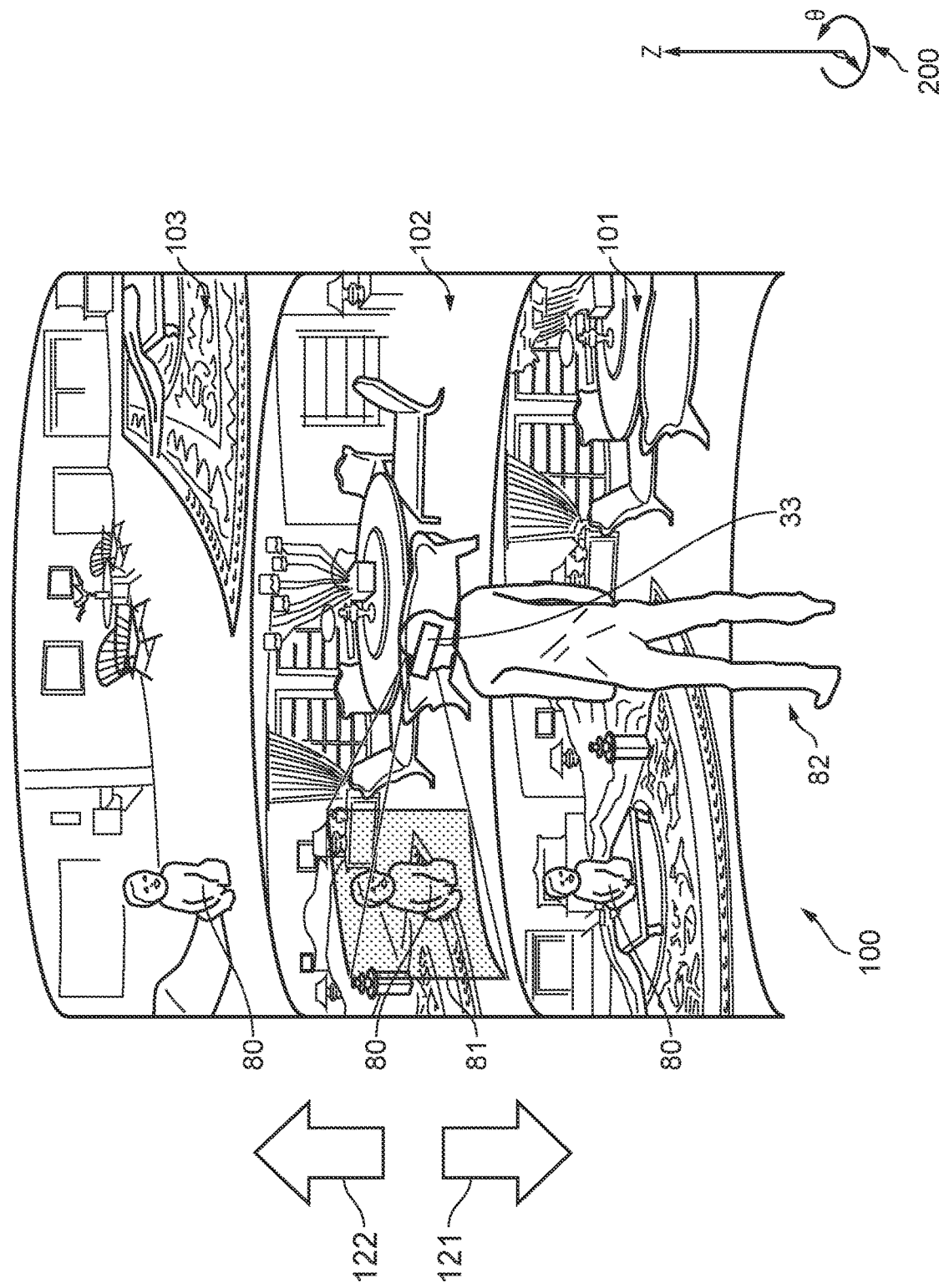
FIG. 13 illustrates a user browsing the panoramic menu after it has been re-arranged.

In block 804 in FIG. 8A, the processor 40 enables the user to browse the panoramic menu 100 after it has been re-arranged. FIG. 13 illustrates the user browsing the panoramic menu 100. The arrows labelled with the reference numerals 121 and 122 schematically illustrate the user's ability to browse the panoramic menu items 101, 102, 103 by redirecting his field of view in the height dimension z. FIG. 13 illustrates a situation where the user 82 has re-directed the central portion 81 of his field of view so that it is aligned with the object of interest 80 in the second panoramic item 102.

Alternatively or additionally, the apparatus 30 may enable the user 82 to browse the panoramic items 101, 102, 103 using an alternative method of user input. For example, the apparatus 30 may enable the user to select an object by actuating one or more joysticks/keys/buttons or making a gesture.

Figure 14:
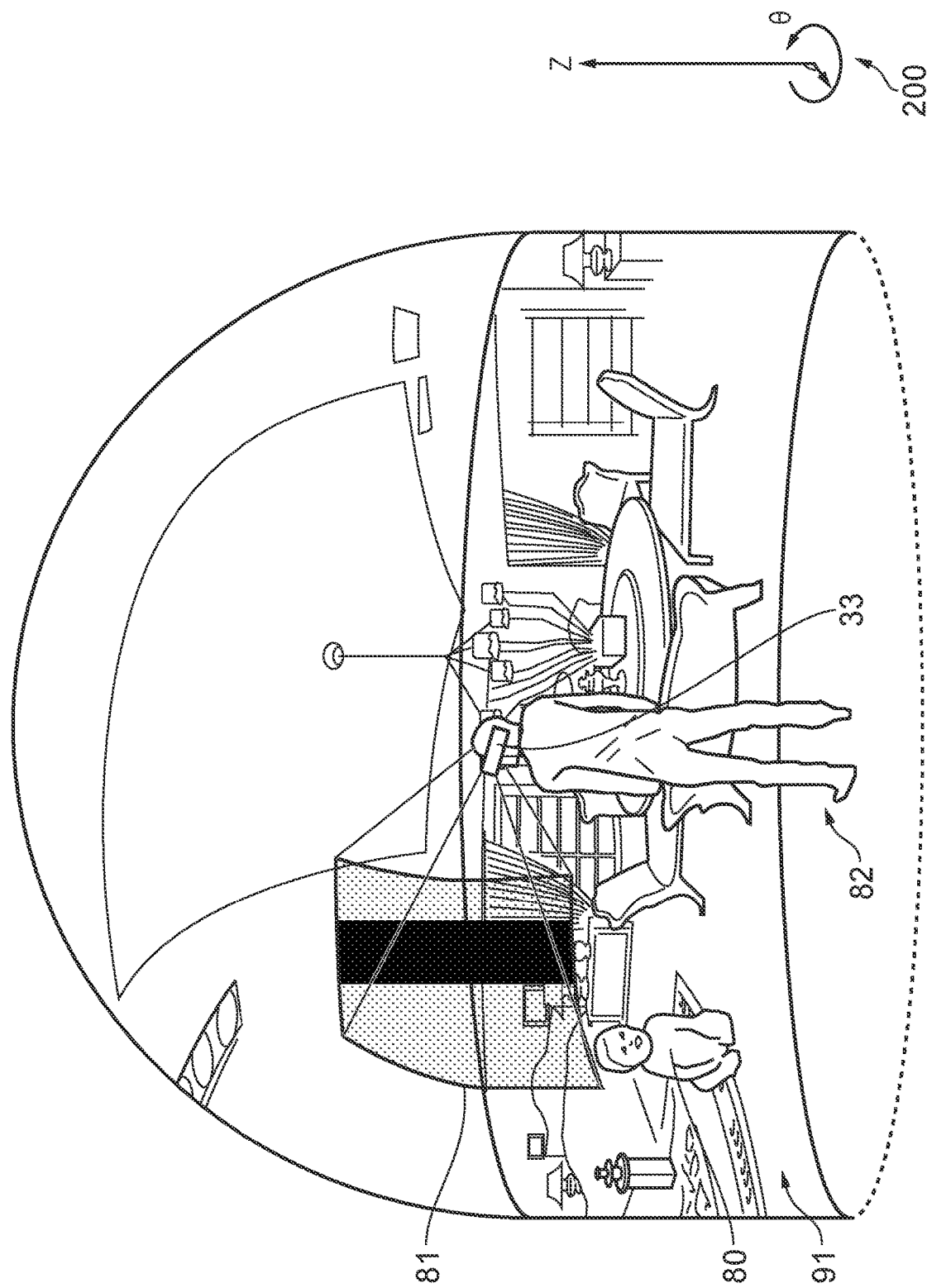
FIG. 14 illustrates mediated reality content being displayed which is associated with a selected panoramic menu item.

The user 82 then selects one of the panoramic menu items 101-103. In block 805 of FIG. 8A, the processor 40 responds to the user selection by causing mediated reality content 91 associated with the selected panoramic menu item to be displayed by the display 32. FIG. 14 illustrates the mediated reality content 91 being displayed by the display 32.

The apparatus 30/33 may enable the user 82 may select one of the panoramic menu items 101-103 by providing user input in a number of different ways. For example, the apparatus 30/33 may enable the user to select a panoramic menu item 101-103 (merely) by aligning the central portion 81 of his field of view at a particular panoramic menu item 101-103 for more than a threshold period of time. In some examples, the user 82 may be required to confirm the selection by pressing a key/button or making a gesture. Alternatively, the central portion 81 of the user's field of view might not be used to perform the selection at all and instead the user 82 may perform his selection by solely making a gesture and/or pressing one or more keys/buttons.

Figure 8B:
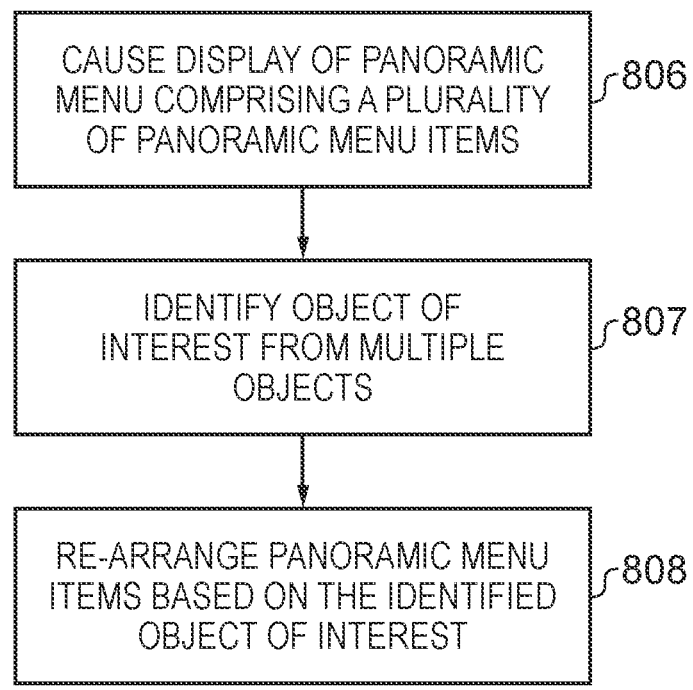
FIG. 8B illustrates a second method of providing and re-arranging a panoramic menu.

FIG. 8B illustrates a flow chart of a second method of displaying a panoramic menu, re-arranging menu items in the panoramic menu and enabling a user to select the menu items.

In block 806 of FIG. 8B, the processor 40 causes the display 32 to display the panoramic menu 100 in the same manner as that described above in relation to FIG. 8A.

Figure 15:
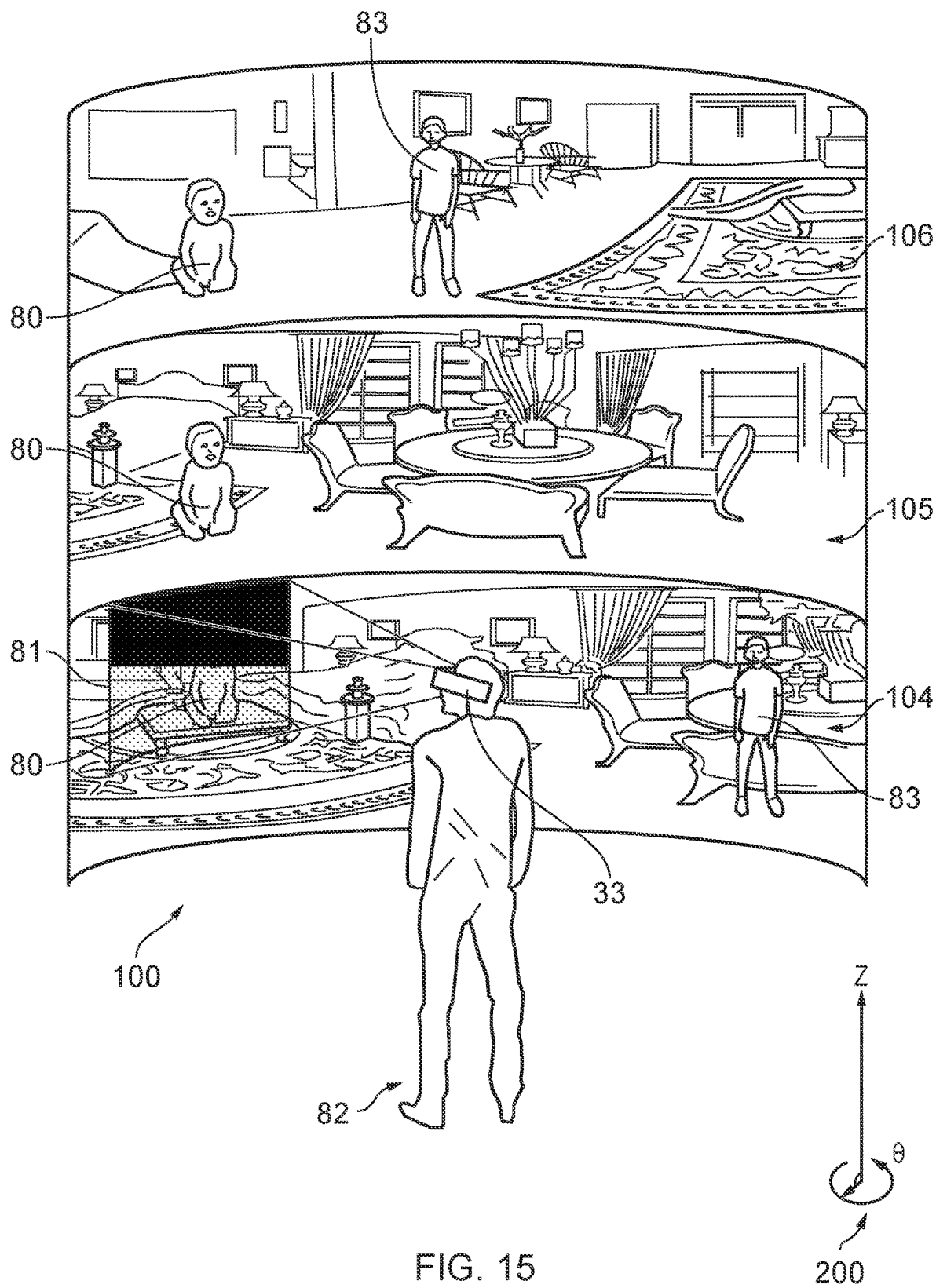
FIG. 15 illustrates a return to the panoramic menu.

FIG. 15 illustrates a situation in which the displayed panoramic menu 100 includes fourth, fifth and sixth panoramic menu items 104-106, which are simultaneously displayed. It can also be seen in FIG. 15 that the fourth, fifth and sixth panoramic menu items 104-106 include a first object 80 and the fourth and sixth panoramic menu items 104, 106 include a second object 83. In FIG. 15, the central portion 81 of the user's field of view is presently aligned (in the height dimension z and the azimuthal dimension ø in FIG. 15) with the first object 80 in the fourth panoramic menu item 104. This may be because the first object 80 has previously been identified to be an object of interest (for instance, as a consequence of user selection, as described above in relation to block 805 in FIG. 8A). The user 82 may browse the panoramic menu items 104-106 and select a panoramic menu item 104-106 in the same manner as that described above.

Figure 16:
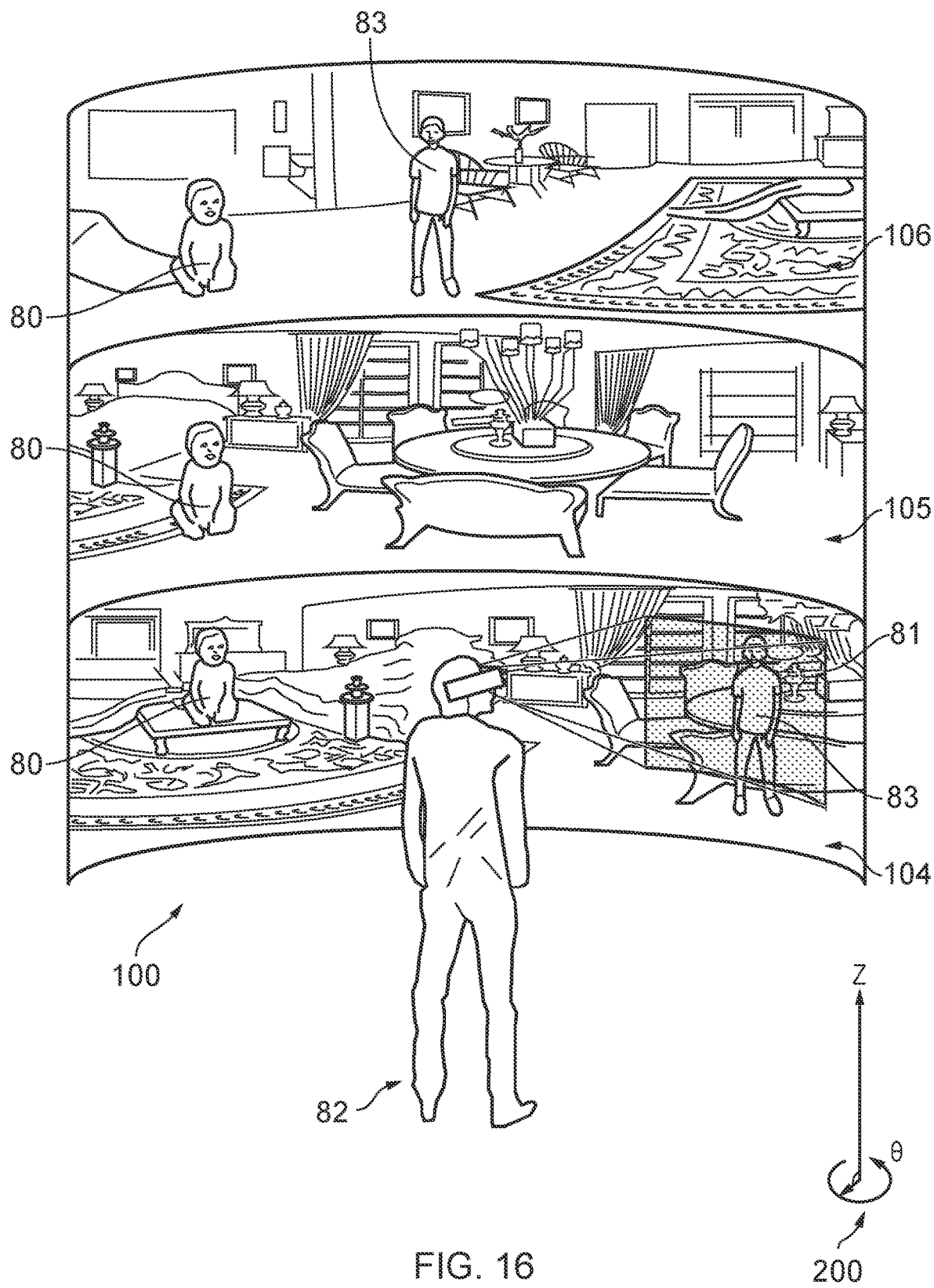
FIG. 16 illustrates the determination of a further object of interest.

The user 82 then changes his point of view such that the central portion 81 of his field of view is aligned with the second object of interest 83 in the fourth panoramic menu item 104, as illustrated in FIG. 16. In block 807 in FIG. 8B, the user 82 provides the necessary input(s) to select the second object 83 in the fourth panoramic menu item 104 such that it is identified by the processor 40 to be an object of interest. The second object 83 may replace the first object 80 as the object of interest, if the first object 80 had previously been identified to be the object of interest.

In block 808 in FIG. 8B, the processor 40 re-arranges the panoramic menu items 104-106 based on the identification of second object 83 as the object of interest, following the user's selection in block 807 in FIG. 8.

Figure 17:
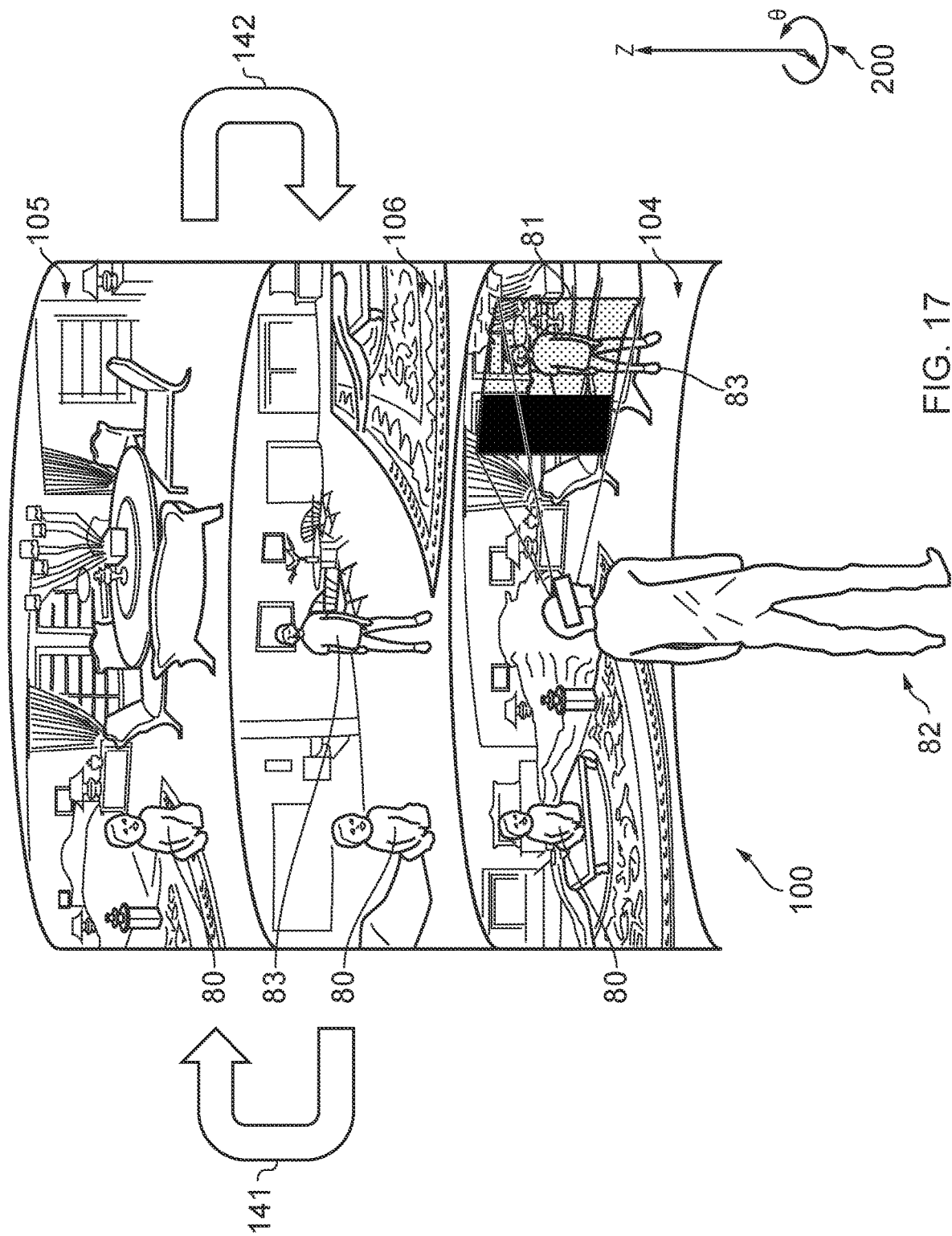
FIGS. 17 and 18 illustrate the panoramic menu items in the panoramic menu being re-arranged based on the determined further object of interest.

FIG. 17 illustrates the panoramic menu items 104-106 being re-ordered based on the identification of the second object 83 as the object of interest. The order of the panoramic menu items 104-106 may, for instance, be changed in the vertical dimension z In this example, the processor 40 causes the sixth panoramic menu item 106 and the fifth panoramic menu item 105 to change places, such that the sixth panoramic menu item 106 is positioned beneath the fifth panoramic menu item 105. This is because the processor 40 has determined that the mediated reality content associated with the sixth panoramic menu item 106 includes the identified (second) object of interest 83 (and, as a consequence, in this example the sixth panoramic menu item 106 also includes the identified object of interest 83), whereas the mediated reality content associated with the fifth panoramic menu item 105 does not (and, as a consequence, in this example neither does the fifth panoramic menu item 105).

The upwards movement of the fifth panoramic menu item 105 is illustrated by the arrow labelled with the reference numeral 141 in FIG. 17. The downwards movement of the sixth panoramic menu item 106 is illustrated by the arrow labelled with the reference numeral 142 in FIG. 17.

The sixth panoramic menu item 106 is brought closer to the user 82 than the fifth panoramic menu item 105 because the processor 40 has identified that its associated mediated reality content is more likely to be of interest to the user 82 than that associated with the fifth panoramic menu item 105.

Figure 18:
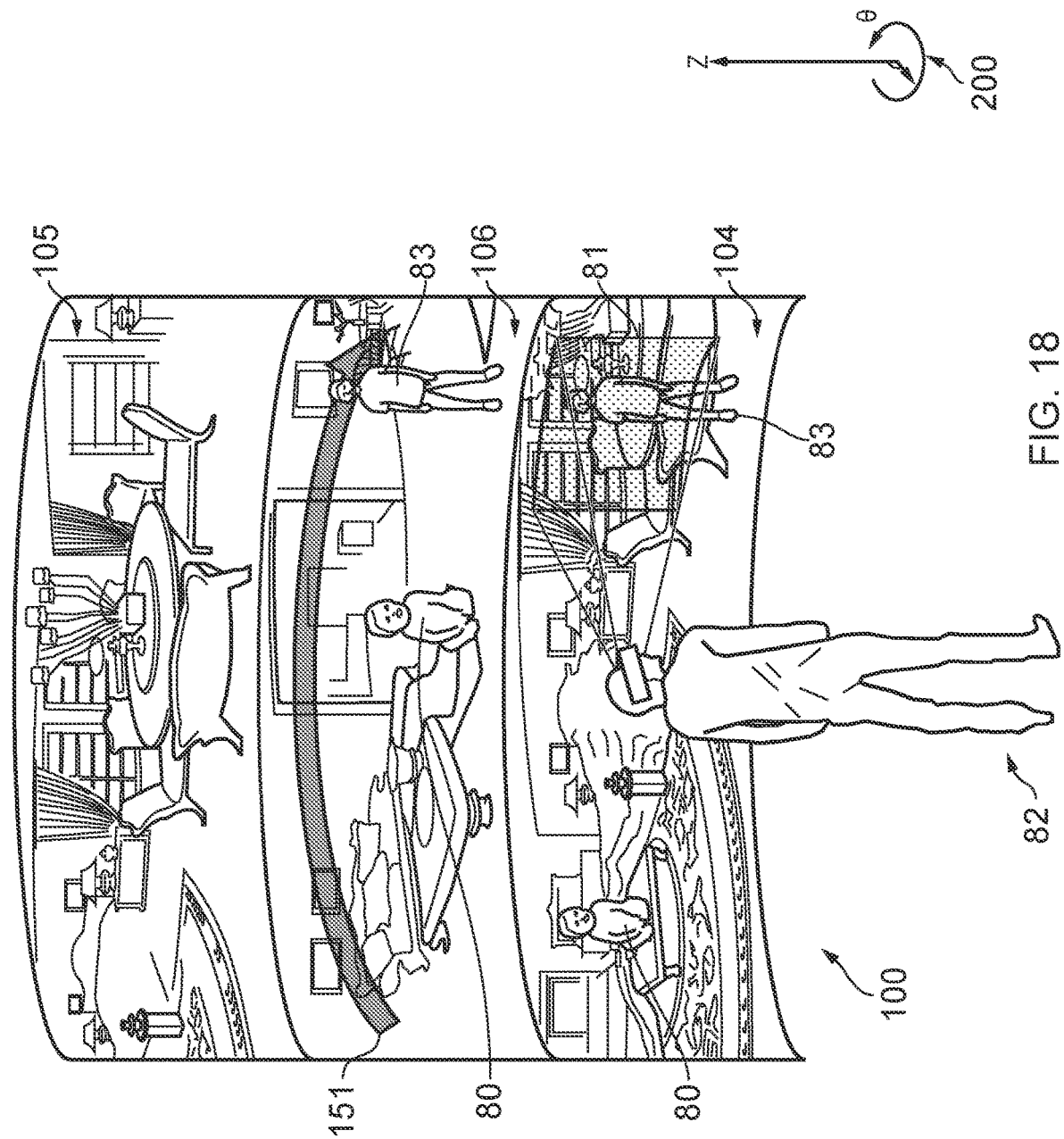

FIG. 18 illustrates the panoramic menu items 104-106 being rotated based on the identification of second object 83 as the object of interest, following the user's selection, in the same manner as that described above in relation to FIG. 12. In this example, the processor 40 determines that the identified second object of interest 83 is not aligned with the central portion 81 of the user's field of view in the azimuthal dimension ø. In response, the processor 40 moves the sixth panoramic menu item 106 by causing it to rotate in the azimuthal dimension ø, as indicated by the arrow labeled with the reference numeral 151 in FIG. 18. It can be seen in FIG. 18 that after the processor 40 has caused the sixth panoramic menu item 106 to rotate, the identified second object of interest 83 in the fourth and sixth panoramic menu items 104, 106 is aligned with the central portion 81 of the user's field of view in the azimuthal dimension ø (and stacked above one another in the height dimension z).

An efficient and intuitive way of presenting and browsing menu items representing mediated reality content has been described above. The panoramic menu 100 described above provides a particularly immersive experience and therefore represents an appropriate gateway for mediated reality content.

Although embodiments of the present invention have been described in the preceding paragraphs with reference to various examples, it should be appreciated that modifications to the examples given can be made without departing from the scope of the invention as claimed. For example, while embodiments of the invention are described above in the context of a head-mounted apparatus 33, a head-mounted apparatus is not necessarily required. For example, the apparatus 30 could include a holographic display that is not head-mounted. Alternatively, the mediated reality content 90, 91 and the panoramic menu 100 could be displayed on or more physical displays, some or all of which could be curved.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. A method, comprising:
causing display of a panoramic menu in which a first panoramic menu item and a second panoramic menu item are simultaneously displayed, wherein the first panoramic menu item extends beyond a user's field of view and is associated with a first mediated reality content, and the second panoramic menu item extends beyond the user's field of view and is associated with a second mediated reality content, different from the first mediated reality content;
identifying an object of interest in one of the first mediated reality content or the second mediated reality content according to a focus of a user on the object in the first mediated reality content or the second mediated reality content;
determining a presence of the object of interest, positioned beyond the user's field of view, in the other of the first mediated reality content or the second mediated reality content in which the object on which the user is focused is present;
in response to determining a presence of the object of interest, rotating the display of the other of the first mediated reality content or the second mediated reality content, associated with the respective first and second panoramic menu items, such that the object of interest is displayed in the respective first or second panoramic menu items and within the user's field of view;
in an instance the object of interest is detected in a third mediated reality content, adding a third panoramic menu item to the panoramic menu, wherein the third panoramic menu item extends beyond the user's field of view and is associated with the third mediated reality content; and
in an instance the object of interest is detected in the third mediated reality content and is not detected in the second mediated reality content, switching a vertical position of the second panoramic menu item and the third panoramic menu item.

2. The method of claim 1, wherein the panoramic menu is displayed by a display of a head-mounted apparatus;
wherein at least one of the first and second panoramic menu items extends around the body of the user; and
wherein at least the first panoramic menu item and the second panoramic menu item form at least part of a virtual tube.

3. The method of claim 1, wherein the first panoramic menu item and the second panoramic menu item are displayed vertically relative to one another; and wherein the rotating of at least the second panoramic menu item vertically aligns the object of interest in the first panoramic menu item and at least the second panoramic menu item.

4. The method of claim 1, wherein the first and second panoramic menu items include the object of interest.

5. The method of claim 4, further comprising:
moving at least one of the first and second panoramic menu items in dependence upon a location of the object of interest in the first and second panoramic menu items.

6. The method of claim 5, wherein the first and second panoramic menu items are rotated such that the object of interest is vertically aligned in the first and second panoramic menu items.

7. The method of claim 1, further comprising:
identifying a further object of interest in mediated reality content; causing display of one or more further panoramic menu items including the further object of interest; and
subsequently moving at least one of the one or more further panoramic menu items in dependence upon a location of the further object of interest in the one or more further panoramic menu items.

8. An apparatus comprising at least one processor and at least one memory, the memory comprising machine-readable instructions, that when executed cause the apparatus to:
display a panoramic menu in which a first panoramic menu item and a second panoramic menu item are simultaneously displayed, wherein the first panoramic menu item extends beyond a user's field of view and is associated with a first mediated reality content, and the second panoramic menu item extends beyond the user's field of view and is associated with a second mediated reality content, different from the first mediated reality content;
identify an object of interest in one of the first mediated reality or the second mediated reality content according to a focus of a user on the object in the first mediated reality content or the second mediated reality;
determine a presence of the object of interest in the other of the first mediated reality content or the second mediated reality content in which the user is focused on the object, wherein the object of interest is positioned beyond the user's field of view in the other of the first mediated reality or the second mediated reality;
in response to determining a presence of the object of interest, rotate the display of the other of the first mediated reality or the second mediated reality, associated with the respective first and second panoramic menu items, such that the object of interest is displayed in the respective first or second panoramic menu items and within the user's field of view;
in an instance the object of interest is detected in a third mediated reality content, add a third panoramic menu item to the panoramic menu, wherein the third panoramic menu item extends beyond the user's field of view and is associated with the third mediated reality content; and
in an instance the object of interest is detected in the third mediated reality content and is not detected in the second mediated reality content, switch a vertical position of the second panoramic menu item and the third panoramic menu item.

9. The apparatus of claim 8, wherein the panoramic menu is displayed by a display of a head-mounted apparatus; wherein at least one of the first and second panoramic menu items extends around the body of the user; and wherein at least the first panoramic menu item and the second panoramic menu item form at least part of a virtual tube.

10. The apparatus of claim 8, wherein the first panoramic menu item and the second panoramic menu item are displayed vertically relative to one another; and wherein the rotating of at least the second panoramic menu item vertically aligns the object of interest in the first panoramic menu item and at least the second panoramic menu item.

11. The apparatus of claim 8, wherein the first and second panoramic menu items include the object of interest.

12. The apparatus of claim 11, further caused to: move at least one of the first and second panoramic menu items in dependence upon a location of the object of interest in the first and second panoramic menu items.

13. The apparatus of claim 12, wherein the first and second panoramic menu items are rotated such that the object of interest is vertically aligned in the first and second panoramic menu items.

14. The apparatus of claim 8, further caused to: identify a further object of interest in mediated reality content; display one or more further panoramic menu items including the further object of interest; and subsequently move at least one of the one or more further panoramic menu items in dependence upon a location of the further object of interest in the one or more further panoramic menu items.

15. At least one non-transitory computer readable medium comprising instructions that, when executed, perform:
display a panoramic menu in which a first panoramic menu item and a second panoramic menu item are simultaneously displayed, wherein the first panoramic menu item extends beyond a user's field of view and is associated with a first mediated reality content, and the second panoramic menu item extends beyond a user's field of view and is associated with a second mediated reality content, different from the first mediated reality content;
identify an object of interest in one of the first mediated reality content or the second mediated reality content according to a focus of a user on the object in the first mediated reality or the second mediated reality;
determine a presence of the object of interest in the other of the first mediated reality content or the second mediated reality content in which the user is focused on the object, wherein the object of interest is positioned beyond the user's field of view in the other of the first mediated reality or the second mediated reality;
in response to determining a presence of the object of interest, rotate the display of the other of the first mediated reality or the second mediated reality, associated with the respective first and second panoramic menu items such that the object of interest is displayed in the respective first or second panoramic menu items and within the user's field of view;
in an instance the object of interest is detected in a third mediated reality content, add a third panoramic menu item to the panoramic menu, wherein the third panoramic menu item extends beyond the user's field of view and is associated with the third mediated reality content; and
in an instance the object of interest is detected in the third mediated reality content and is not detected in the second mediated reality content, switch a vertical position of the second panoramic menu item and the third panoramic menu item.

* * * * *